UNITED STATES PATENT OFFICE.

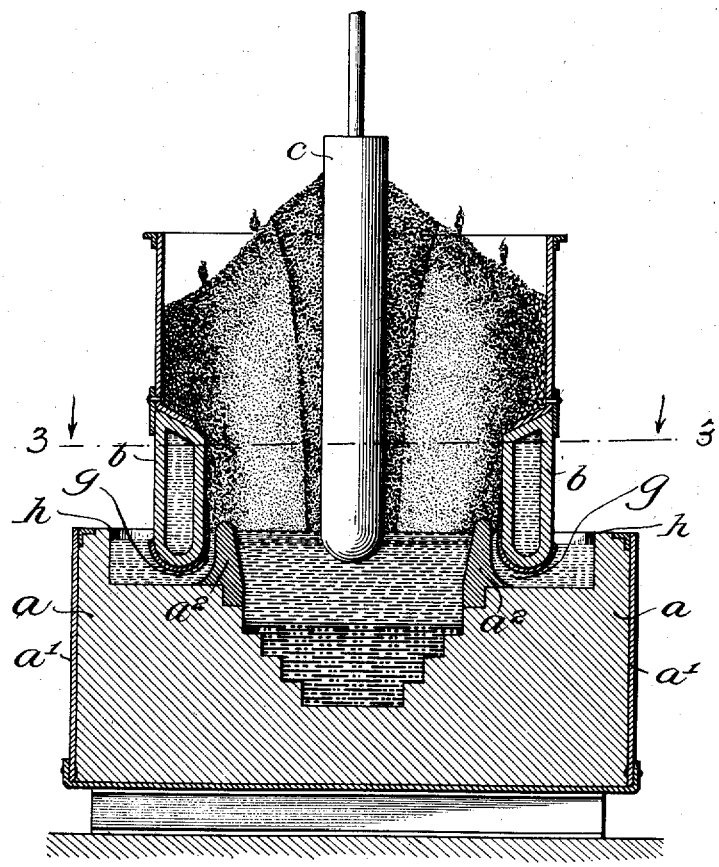

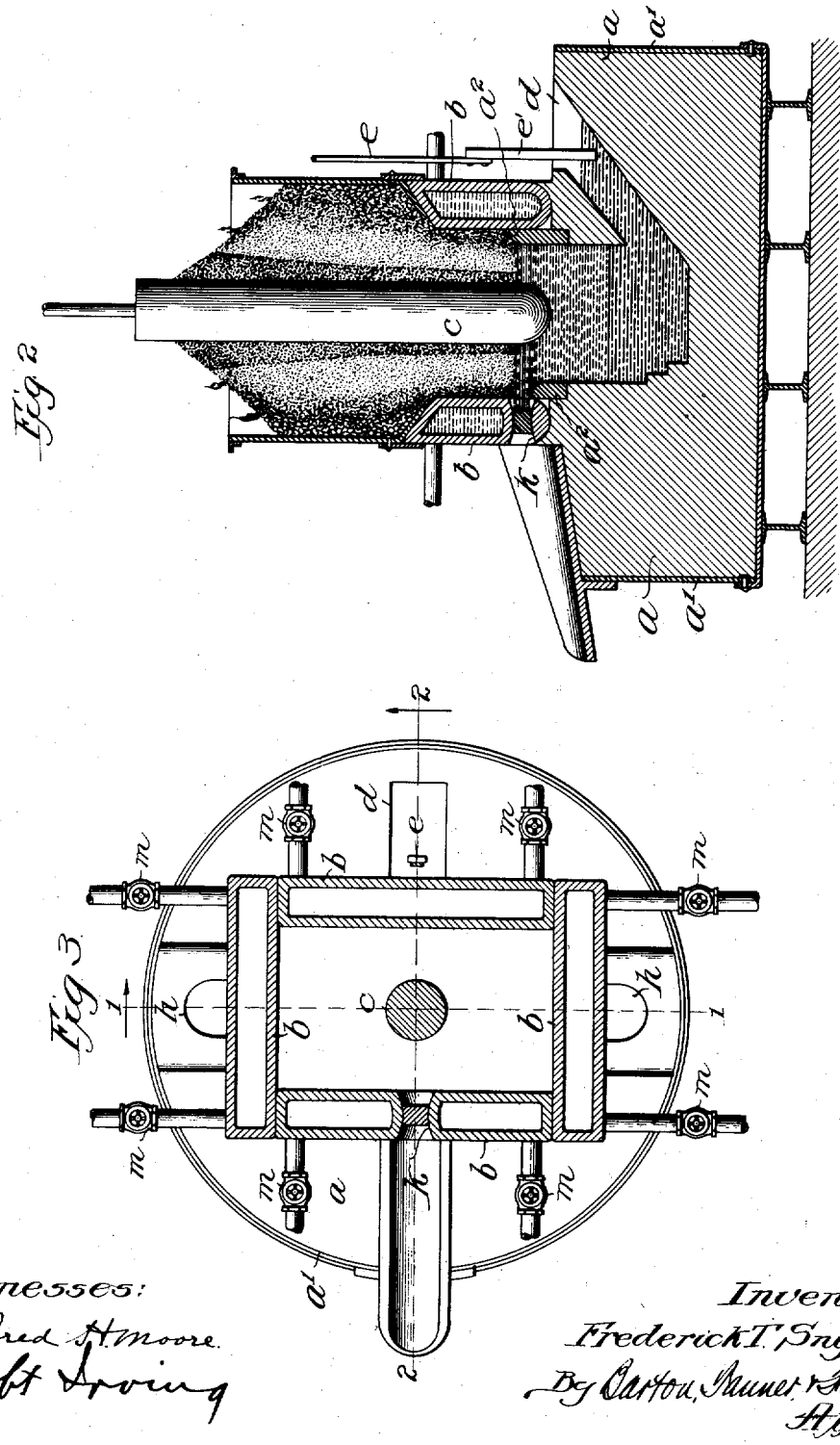

FREDERICK T. SNYDER, OF OAK PARK, ILLINOIS, ASSIGNOR TO ELECTRIC METALS COMPANY, OF CHICAGO, ILLINOIS, A CORPORATION OF WEST VIRGINIA.

SMELTING-FURNACE.

No. 859,133.　　　　Specification of Letters Patent.　　　　Patented July 2, 1907.

Application filed June 18, 1906. Serial No. 322,140.

*To all whom it may concern:*

Be it known that I, FREDERICK T. SNYDER, a citizen of the United States, residing at Oak Park, in the county of Cook and State of Illinois, have invented a certain new and useful Improvement in Smelting-Furnaces, of which the following is a full, clear, and exact description.

My invention relates to a smelting furnace, and is intended more particularly for the treatment of ores containing a compound of a metal which is volatile at reduction. For example, my furnace will be especially useful in the treatment of zinc ores, and in connection with such ores an object of this invention is to construct a furnace which will produce spelter as a direct product of the smelting operation, instead of zinc dust.

The present commercial method of treating zinc ores involves the distillation of the ore with carbon in retorts by means of external heat. This method is generally conceded to be a wasteful metallurgical operation, due to the excessive fuel consumption, the destruction of the retorts by corrosive slags, and the loss of zinc. The method, furthermore, is not a continuous one, and only a small quantity of ore is treated at a time in a retort.

Attempts have been made to smelt zinc ores electrically, in a continuous operation, but heretofore it has been difficult, if not impossible, to produce any considerable proportion of the zinc in liquid or compact form as a direct product of the smelting operation, because the zinc vapor produced has been diluted with such quantities of CO gas and other impurities that it would not condense in liquid form, but would be wholly or in large part in the form of zinc dust, or so-called "blue powder." It has also been proposed to smelt zinc ores in a blast furnace under very high pressure in order to prevent the zinc from vaporizing at reduction. This process, however, involves many mechanical difficulties and the expenditure of great energy in forcing the blast into the furnace against the high internal pressure.

By means of the furnace of this invention, zinc ores, or ores of other metals which are volatile at reduction, can be smelted electrically under such conditions that the non-condensable gases and the metallic vapor are removed from the furnace separately, the zinc being condensed and recovered in coherent liquid form. The furnace is constructed with an outlet for non-condensable vapors through a body of porous material which is being progressively delivered to the furnace chamber, so that metallic products condensed in said porous material will be returned to the heated zone and re-vaporized. An outlet for zinc is provided through the side of the furnace near the smelting zone but above the slag level, said outlet being sealed against the exit of gas therethrough, and the walls are preferably cooled to condense the zinc, the liquid metal being drained off through said outlet. In treating low grade zinc ores, or ores containing considerable quantities of lead or copper or slag-forming material, the lead may be collected in a body under the bath of molten slag and the copper collected in a matte.

The furnace of this invention will be more particularly explained and further features thereof described by reference to the accompanying drawings, in which, Figure 1 is a vertical sectional elevation of the furnace on line 1—1 of Fig. 3; Fig. 2 is a sectional elevation on line 2—2 of Fig. 3; Fig. 3 is a sectional plan view on line 3—3 of Fig. 1.

The same letters of reference are used to designate the same parts wherever they are shown.

The form of furnace shown in the drawings consists of a crucible $a$ of fire brick which may be supported in a circular iron casing $a^1$, as shown, and this crucible is surmounted by a furnace chamber, the lower side walls $b$ whereof are made of hollow iron jackets or conduits through which a flow of water is maintained. Above the chamber the side walls of the furnace are continued to form a chute or stack which is open at the top to receive the furnace charge and to permit the escape of non-condensable vapors. Through the center of the stack a carbon electrode $c$ extends downward to about the level of the top of the crucible $a$ to make contact with the molten slag in the furnace. The bottom of the crucible is filled with molten lead, forming the other electrode. A lead well $d$ leads outward from the bottom of the crucible to a point outside the furnace walls, and an electric conductor $e$ dipping into the molten metal in the lead well $d$ serves to complete the circuit through the furnace from the carbon electrode $c$. The slag immediately in the vicinity of the electrode $c$ is molten, but toward the walls of the furnace it is cooler, and on the walls it is congealed to form a lining therefor, this lining being self-renewing, and being kept from melting by the water jackets. The furnace chamber is preferably rectangular in form, as shown in Fig. 3, so that the end walls will be at a greater distance from the electrode than the side walls. I also preferably maintain a greater volume of water flowing through the end walls; the result being that there is a greater tendency for the zinc vapor to condense at the ends of the furnace than near the sides within the zone of maximum heat.

As shown in Fig. 1, the upper rim $a^2$ of the crucible, which may be of fire brick or of congealed slag, is separated a short distance from the water-cooled walls $b$, leaving passages $g$ $g$ leading under said walls and communicating with wells or metal receptacles $h$ $h$ which open outside the furnace. These passages $g$, which are U-shaped, serve as drains to collect the liquid zinc which has condensed at or near the water-cooled walls $b$ inside the furnace. The liquid metal contained in the passages serves to connect the slag rim $a^1$ of the crucible with the water-cooled wall $b$ so as to conduct away sufficient heat to prevent said rim from being melted down. The liquid metal held in said U-shaped passages also serves to prevent the exit of gas from the furnace through said passages, and to condense zinc vapor coming in contact with said liquid zinc.

The material of the charge is fed in through the open top of the furnace, a layer of carbon being preferably filled in around the electrode and the charge heaped up toward the center, so as to form an incline down which the larger pieces will tend to roll, the result being that the body of material in the furnace is more porous toward the outside, to facilitate the passage of gaseous products from the heated zone toward the wells. The furnace thus has an outlet for non-condensable gases through the porous material of the charge, quite distinct from the outlet for zinc through which no gas may pass. The material of the charge surrounds and supports the central vertical electrode, and forms a porous spacing medium between said electrode and the water-cooled walls. There will be a tendency for the zinc in the passages $g$ to congeal upon the water-jackets $b$, as shown in Fig. 1; and I take advantage of this fact to control the area of these passages or outlets by controlling the supply of water to the water-jackets. Valves $m$ $m$ are provided upon the water pipes for this purpose. By lessening the flow of water through the jackets the tendency of the zinc to congeal and close the passages may be overcome, and vice versa, so that the openings may be regulated as desired; or one passage may be entirely closed and another left open.

It will be observed that a distinctive feature of this furnace is the location of an outlet for zinc above the level of the slag or molten bath in the furnace, this zinc outlet being maintained closed against the passage of gas therethrough, and a separate outlet being provided for the non-condensable gases, such as CO, through the porous charge, this gas outlet being maintained sufficiently cool to condense any metallic vapor in the body of the charge. It will further be observed that the gas outlet is arranged to deliver the material therein progressively to the smelting zone of the furnace which is below the zinc outlet, so that the metal condensed in said porous charge will be returned again to the place of greater heat and re-vaporized. The only escape for the volatile metal is that provided by the passages $g$ which collect the liquid which has been condensed by the water-cooled walls. Said walls, which form condensers for the metallic vapor, may be constructed of iron.

I will describe the operation of my furnace particularly in its application to the treatment of zinc-lead ore. Such ores are preferably first roasted down to about 8 per cent in sulfur, and the furnace charge is made up of the roasted ore mixed with carbon in the form of coke, or charcoal, and with fluxes, such as lime and iron (unless already present in the core in the desired quan-
tities) in such proportions as to form what is known as a "high temperature" slag, that is, a slag which requires a high temperature for its formation. Such a slag will be high in lime and silica, the proportion of silica being 50 per cent or more. This slag is desirable in the smelting of zinc ores because it will not retain any appreciable quantity of zinc. The furnace charge will be fed into the open top of the rectangular stack, in the manner previously described, coke being also added around the electrode, as shown. Current being passed through the furnace between the electrode $c$ and the conductor $e$ dipping into the lead well, a zone of maximum heat will be established around the lower end of the electrode which will reduce the materials of the charge, forming gas, slag, matte, lead and metallic zinc, the latter being liberated in the form of vapor. The lead which is produced sinks to the bottom and adds to the body of molten lead in the crucible, from which it may be ladled out from time to time through the lead well $d$. The slag which is formed is molten in the vicinity of the electrode but around the hollow walls through which the water flows, it is congealed to form a lining for said walls. The CO gas which is formed as one of the products of the smelting operation escapes through the ore body to the top, where it may be burned. The conditions are such, however, that the escape of the gaseous products is restricted so that a comparatively high pressure is maintained in the central portion of the ore body. The zinc vapor which is produced, in attempting to escape with the CO gas, becomes condensed in the ore body as the gases leave the central heat zone before reaching the upper surface. Then as the ore is progressively fed toward the heat zone the condensed zinc, which may be in the form of dust, is again brought into the zone of maximum heat and revaporized, the result being that the mixture of gas in the furnace is progressively enriched until the percentage of zinc in the mixture is sufficiently high so that the zinc condenses in liquid form. This liquid zinc collects in the cooler portions of the ore body, which in the furnace illustrated will be at the end walls, and may be drained off under said walls through the passages $g$ into the wells $h$, from which it may be ladled. There will be no appreciable collection of liquid zinc at the walls nearer the electrode, because the zone of high temperature, which is above the boiling point of zinc, extends outward as far as the side walls, and the zinc within this zone is vaporized. The slag, as it accumulates, may be drawn off through a suitable slag tap $k$, which is below the level of the zinc outlet. As the body of matte accumulates in the furnace, portions of it will be drawn off from time to time, with the slag, and may be settled out of the slag and recovered.

While my invention has been particularly described in its application to a furnace particularly intended for smelting lead-zinc ore, it will be apparent that it is not limited to such application; and it will also be apparent that certain features or combinations herein disclosed will be advantageous in furnaces which may not embody all the other features which are combined in the form shown in the drawings.

The process herein described has been made the subject of a separate application, Serial No. 321,159, filed by me June 11, 1906. Certain other features disclosed but not claimed herein are claimed in my applications, Serial No. 324,116, filed June 20, 1906, Serial No. 324,117, filed June 30, 1906, and Serial No. 266,541, filed June 23, 1905.

I therefore claim:

1. The combination with a smelting furnace, of a metal-receptacle communicating with the interior and exterior of the furnace but closed against the passage of gas therethrough, said furnace having a gas-outlet filled with porous material adapted to condense metallic vapors, said gas-outlet being arranged to deliver said porous material into the furnace.

2. The combination with a smelting furnace, of a metal-receptacle communicating with the interior and exterior of the furnace but closed against the passage of gas therethrough, said furnace having a gas-outlet separate from said metal-receptacle, said gas-outlet being filled with porous material, a conduit filled with fluid arranged to cool said metal-receptacle, and electric means for heating the furnace to a smelting temperature below the mouth of said metal-receptacle.

3. In a smelting furnace, the combination with a refractory base, of water cooled side-walls surmounting said base, said furnace having a slag-tap and an opening through the furnace-walls at a higher level than said slag-tap, said higher opening being constructed to hold liquid metal therein to control the escape of gas therethrough, means for maintaining a flow of cooling fluid near said higher opening, and a gas-outlet for said furnace separate from the last-mentioned opening.

4. The combination with a smelting furnace, of a metal-receptacle connected by openings with the interior and exterior of said furnace but formed to prevent the passage of gas from said furnace, said furnace having a gas-outlet separate from said metal receptacle, said gas outlet being filled with porous material adapted to condense metallic vapor means for cooling said metal-receptacle, and electric means for developing the maximum heat in said furnace below the opening into said metal-receptacle.

5. In an electric furnace, the combination with a refractory base having a crucible therein, of a chamber wall surmounting said base, said wall being hollow and filled with cooling fluid, the furnace chamber having an open top adapted to receive the materials of a charge and to allow escape of the non-condensable gaseous products from said open top, and a drain between said crucible and said wall to collect liquid condensed by said wall, and means for passing an electric current through the material of the charge.

6. In an electric furnace, the combination with a refractory base, of chamber walls surmounting said base, the lower portions of said walls being hollow to receive a cooling fluid, the furnace chamber being open at the top to receive the charge, and constructed to permit the continuous escape of the non-metallic gaseous products, and an opening being provided between the lower part of the chamber wall and the base to allow the liquid metal condensed at said wall to drain off.

7. In an electric zinc-smelting furnace, the combination with a base of refractory material having a crucible therein, of a water-jacketed wall surmounting said base to form a furnace chamber, the top of said chamber being open, a bath of molten conducting material in said crucible, a carbon electrode extending down through the open top of the furnace and making electrical connection with said molten bath, said furnace having an outlet for zinc opening off the furnace chamber at a point above said molten bath, said outlet being sealed against the passage of gas therethrough.

8. In an electric zinc-smelting furnace, the combination with a base of refractory material having a crucible therein, of a water-jacketed wall surmounting said base to form a furnace chamber, a bath of molten conducting material in said crucible, a carbon electrode extending down through the open top of the furnace and making electrical connection with said molten bath, a rim of solid material at the edge of said bath at a distance from the wall, said rim extending above the level of said bath and forming a dam adapted to collect the liquid zinc condensed at said wall, said furnace having an outlet from said dam leading through said water-jacketed wall, said outlet being sealed by liquid zinc against the passage of gas therethrough.

9. The combination with a smelting furnace, of a receptacle for condensed metal connecting with the interior and exterior of said furnace but formed to obstruct the exit of gas from said furnace, said furnace having a separate gas-outlet filled with porous material, means for cooling said receptacle, and electric means for internally heating the furnace charge to a smelting temperature, at a point below the connection of said receptacle with said furnace.

10. An electric zinc-smelting furnace, having a gas-outlet filled with porous material adapted to condense zinc vapor from said furnace, said outlet being arranged to deliver said porous material into the furnace to return the condensed zinc, said furnace having a slag bath therein, means for passing an electric current through said slag, and a zinc receptacle opening off the furnace above said slag, said receptacle being closed against the passage of gas therethrough.

11. The combination with an electric smelting furnace containing molten material, of a metal-receptacle communicating with the interior of the furnace above said molten material but closed against the egress of gas therethrough, and a separate gas-outlet for the furnace, independent of said metal-receptacle.

12. The combination with an electric furnace, of a condenser formed to prevent the passage of gas through said condenser, means for cooling said condenser, said furnace having a gas-outlet independent of said condenser containing porous material, and means for cooling said porous material.

13. In a smelting furnace, the combination with a base, of furnace walls arranged to have an open top adapted to permit continuous escape of gas, an opening being provided through the walls to withdraw slag, and a second opening through the walls located at a higher level than said slag opening, and molten metal contained in said higher opening, sealing the same against the passage of gas.

14. The combination with an electric smelting furnace, of a water-cooled wall, and a congealed slag dam inside said wall, liquid metal being collected between said dam and said wall, whereby the heat from said dam is conducted to said wall and the melting of said dam prevented.

15. The combination with a smelting furnace having a plurality of outlets adapted to receive the vaporized or liquid product from said furnace, of fluid-carrying means for cooling said outlets below the boiling point of the metal being smelted in said furnace, electric means for heating the contents of said furnace above the boiling point of said metal, and means for separately regulating the flow of cooling fluid adjacent to the different outlets, whereby the passage through each outlet may be restricted by controlling the congealing of metal therein.

16. In a smelting furnace, the combination with a chamber containing an electrode, of a water-cooled condensing surface forming part of the interior surface of the wall of said chamber, and means for collecting liquid metal condensed by said water-cooled surface said chamber having a continuously open outlet for gas from the interior thereof, independent of said condensing surface, means for condensing and returning to the furnace condensable gases passing to said independent outlet, and a crucible base for the furnace, below said condensing surface, adapted to contain molten slag.

17. In an electric furnace, the combination with a crucible adapted to contain molten resistance material, of a condensing surface extending upwardly near the edge of the crucible, and a dam or rim of refractory material interposed between said condensing surface and the molten material adapted to collect and protect the liquid condensed by said surface.

18. In a smelting furnace, the combination with a vertical electrode, of water jacketed sides, and an outlet through said water jacket containing liquid zinc arranged to seal said outlet against the passage of gas therethrough said furnace having a separate cooled outlet for non condensible gases, independent of said zinc-outlet.

19. In a smelting furnace, the combination with a source of electric heat, of furnace walls at different distances from said source of heat forming a chamber around the same, a slag-tap through the wall nearer to said source of heat, means for cooling the wall which is farther from the source of heat, to condense metallic vapor, and means for collecting and removing the condensed metal.

20. The combination with a smelting furnace, of a receptacle for condensed metal connecting with the interior and exterior of said furnace but formed to obstruct the exit of gas from said furnace, said furnace having a separate outlet for gas, independent of said receptacle for condensed metal, adapted to permit a continuous escape of non-condensible gases, means for cooling said receptacle, and electric means for heating the furnace charge to a smelting temperature.

21. The combination with a smelting furnace having a gas outlet filled with porous material to condense vapor from said furnace, said outlet being arranged to deliver said porous material into the furnace to return the condensed vapor thereto, of means for cooling said porous material, said furnace having a slag bath therein, and means for heating said bath with electricity.

22. The combination with an electric smelting furnace, of a condenser formed to restrict the passage of gas through said condenser, said furnace having a separate gas outlet independent of said condenser, said gas outlet containing porous material, and means for cooling said condenser.

23. The combination with an electric furnace, of a zinc receptacle having a restricted inlet communicating with said furnace said furnace having a separate gas outlet independent of said zinc receptacle, adapted to permit the continuous escape of non-condensable gases.

24. A zinc smelting furnace with an internal electrical source of heat, having a gas-outlet containing porous material adapted to restrict the exit of gas therethrough, and a separate restricted outlet for zinc, independent of said gas outlet whereby internal pressure is developed in the furnace by the gases produced in the smelting operation.

25. A smelting furnace provided with an internal electrical source of heat, said furnace having an outlet for gas, restricted sufficiently to cause the development of internal pressure in the furnace considerably above atmospheric pressure, in combination with a condenser communicating with the interior of the furnace, independently of said gas outlet said condenser being also constructed to restrict the exit of gas therethrough, to maintain said internal pressure, and to force the non-condensable gas out through said first mentioned outlet whereby metallic vapor is caused to condense as a liquid.

In witness whereof, I, hereunto subscribe my name this 16th day of June, A. D., 1906.

FREDERICK T. SNYDER.

Witnesses:
ALFRED H. MOORE,
GEORGE P. BARTON.